A. P. CRELL.
TIRE CARRIER.
APPLICATION FILED DEC. 9, 1918.

1,331,245.

Patented Feb. 17, 1920.

Inventor
Albert P. Crell,
By
Ichiel J. Cilley
Attorney

UNITED STATES PATENT OFFICE.

ALBERT P. CRELL, OF GRAND RAPIDS, MICHIGAN, ASSIGNOR TO NEW ERA SPRING & SPECIALTY COMPANY, OF GRAND RAPIDS, MICHIGAN, A CORPORATION OF MICHIGAN.

TIRE-CARRIER.

1,331,245.  Specification of Letters Patent.  Patented Feb. 17, 1920.

Application filed December 9, 1918. Serial No. 265,995.

*To all whom it may concern:*

Be it known that I, ALBERT P. CRELL, a citizen of the United States, residing at Grand Rapids, in the county of Kent and State of Michigan, have invented certain new and useful Improvements in Tire-Carriers, of which the following is a specification.

My invention relates to improvements in vehicle wheel-rim and tire carriers for use upon automobiles, &c., and its object is to provide a cheap, thoroughly practical and easily applied carrier with which the tire may be readily and securely locked into place to render it absolutely safe from jarring out of the carrier, or of being removed without proper means for unlocking the carrier.

Figure 1:
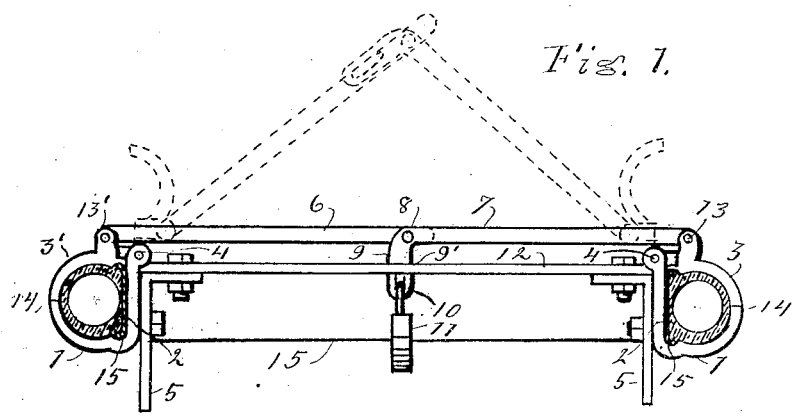
Figure 2:
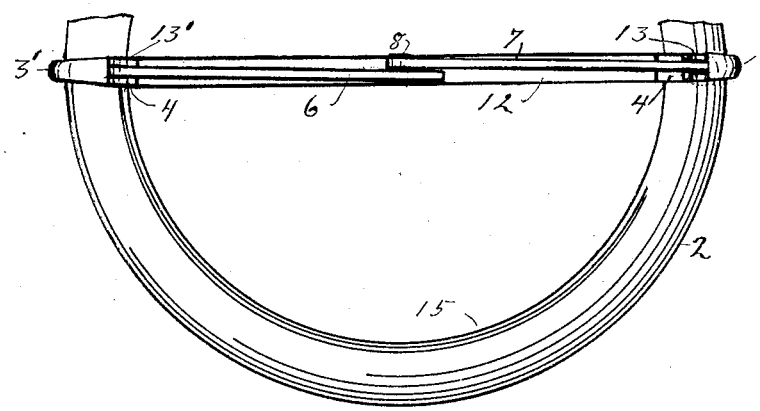

I attain this object by the mechanism and construction disclosed in the accompanying drawing, in which Figure 1 is a plan of the carrier showing the tire in cross section, and Fig. 2 is an elevation of the carrier with a part of a tire in position.

Similar numerals refer to similar parts throughout the two views of the drawing.

In the construction of this carrier I provide a pair of suitable connecting posts, as 5, that may be readily secured to any part of an automobile, desired, and secure to these supports a bar 12, by means of bolts or other suitable connecting elements, as indicated in Fig. 1. To the outer ends of these supports I secure permanent jaws 1, and to these jaws I pivotally secure adjustable jaws 3, as at 4, so these jaws may be opened and closed, as indicated by their solid lines, and dotted lines in Fig. 1. The bar 12 has a mortise through it at 9′ for the free passage of the end 9 of the lever 7, one end of which is pivotally connected with one of the adjustable jaws 3, as at 13 to the right of Fig. 1, and at the other end with the end of the lever 6, as at 8; the other end of the lever 6 being pivotally connected with the adjustable jaw 3′ as at 13′, and is so arranged that when the levers 6 and 7 are carried into the positions indicated by their dotted lines in Fig. 1 the jaws 3 and 3′ are carried into the positions indicated by their dotted lines, and the tires may be readily placed or removed, as desired.

When a tire has been properly placed into the holder the levers 6 and 7 are carried into the position indicated by their solid lines in Fig. 1, with the end 9 of the lever 7 passed through the mortise at 9′, when the adjustable jaws mounted upon the permanent jaws at 4, will be clamped firmly around the tire 2 forming a closely connected joint at 14, and closely clamping the rim 15 so the tire and rim will be held securely in place.

I provide for locking the tire securely within the space between the arms 1 and 3, by securing a pad lock 11 or other appropriate locking device in the opening 10 through the end of the offset 9 of the lever 7, as indicated in Fig. 1.

What I claim as new in the art is:

1. In a tire carrier, permanent jaws properly secured to supporting elements on a vehicle, a bar connecting said permanent jaws, adjustable jaws pivotally mounted upon said permanent jaws, each pair of jaws arranged to close and form an annular bearing around the tire and rim, for supporting and carrying said tire and rim, actuating levers pivotally connected at one end of each with one of the adjustable jaws and the other ends of the levers pivotally connected together, and means for securely locking the connected ends of the levers to the cross bar.

2. In a tire carrier, standards secured to an automobile, a permanent jaw secured to one end of each of said standards, an adjustable jaw pivotally secured to each of said permanent jaws, each of said adjustable jaws having a lever pivotally connected therewith, and the free ends of said levers pivotally connected midway between the jaws, a cross piece connecting the standards and having a mortise through it near its longitudinal center, one end of one of the levers offset and arranged to pass through the mortise in the cross bar, and means for locking the levers securely in place when the arms are closely clasped around a tire.

ALBERT P. CRELL.